United States Patent
Yang et al.

(10) Patent No.: US 9,092,520 B2
(45) Date of Patent: Jul. 28, 2015

(54) NEAR-DUPLICATE VIDEO RETRIEVAL

(75) Inventors: Linjun Yang, Beijing (CN); Lifeng Shang, Henan Province (CN); Xian-Sheng Hua, Bellevue, WA (US); Fei Wang, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 530 days.

(21) Appl. No.: 13/163,921

(22) Filed: Jun. 20, 2011

(65) Prior Publication Data

US 2012/0321181 A1    Dec. 20, 2012

(51) Int. Cl.
*G06K 9/62* (2006.01)
*G06K 9/00* (2006.01)
*G06F 17/30* (2006.01)

(52) U.S. Cl.
CPC ...... *G06F 17/30784* (2013.01); *G06K 9/00751* (2013.01); *G06K 9/00758* (2013.01)

(58) Field of Classification Search
CPC .............. G06F 17/30799; G06F 17/30784; G06K 9/00744; G06K 9/00751; G06K 9/4647; G06K 9/6212; G06K 9/00758
USPC .......... 382/165, 170, 209; 386/252; 707/E17.02
See application file for complete search history.

(56) References Cited

U.S. PATENT DOCUMENTS

| | | | |
|---|---|---|---|
| 8,145,015 B2* | 3/2012 | Li et al. | 382/305 |
| 2003/0174859 A1* | 9/2003 | Kim | 382/100 |
| 2008/0152225 A1* | 6/2008 | Iwamoto | 382/190 |
| 2008/0288509 A1* | 11/2008 | Mysen et al. | 707/100 |
| 2010/0247073 A1 | 9/2010 | Nam et al. | |

OTHER PUBLICATIONS

Zhao et al., "Dynamic Texture Recognition Using Local Binary Patterns with an Application to Facial Expressions," IEEE Transactions on Pattern Analysis and Machine Intelligence, vol. 29, No. 6, Jun. 2007, pp. 915-928.*

A new combination feature of S-LBP and main color descriptor for video frame retrieval Honggang Zhang; Lixia Liu; Aiping Feng; Xinxin Wan; Jun Guo Network Infrastructure and Digital Content, 2010 2nd IEEE International Conference on DOI: 10.1109/ICNIDC.2010.5657797 Publication Year: 2010, pp. 398-403.*

Bhat, et al., Ordinal measures for image correspondence, IEEE Transactions on Pattern Analysis and Machine Intelligence, vol. 20, No. 4, Apr. 1998, 9 pages.

Boughorbel, et al., "Generalized histogram intersection kernel for image recognition", 2005 IEEE. 2005 Interantional Conference on Image Processing, Sep. 11-14, 2005, Genoa, retrieved at <<http://perso.lcpc.fr/tarel.jean-philippe/publis/jpt-icip05.pdf>> 4 pages.

(Continued)

*Primary Examiner* — Kim Vu
*Assistant Examiner* — Michael Vanchy, Jr.
(74) *Attorney, Agent, or Firm* — Ladislav Kusnyer; Judy Yee; Micky Minhas

(57) ABSTRACT

A similarity of a first video to a second video may be identified automatically. Images are received from the videos, and divided into sub-images. The sub-images are evaluated based on a feature common to each of the sub-images. Binary representations of the images may be created based on the evaluation of the sub-images. A similarity of the first video to the second video may be determined based on a number of occurrences of a binary representation in the first video and the second video.

20 Claims, 8 Drawing Sheets

(56) References Cited

OTHER PUBLICATIONS

Broder, On the resemblance and containment of documents, In the Proceedings of Compression and Complexity of Sequences, Jun. 11-13, 1997, Salerno, Italy, 9 pages.
Chiu, et al., Fast min-hashing indexing and robust spatiotemporal matching for detecting video copies, ACM 2008, 30 Pages.
Chum, et al., Geometric min-Hashing: Finding a (Thick) Needle in a Haystack, 2009 IEEE Conference on Computer Vision and Pattern Recognition, Jun. 20-25, 2009, Miami, Florida, 8 pages.
DeMenthon, et al., Video retrieval of near-duplicates using k-nearest neighbor retrieval of Spatio-Temporal descriptors, 2004, Kluwer Academic Publishers, 29 pages.
Dong, et al., Efficiently matching sets of features with random histograms, MM 2008, Oct. 26-31, 2008, Vancouver, BC, Canada, 10 pages.
Douze, et al., An image-based approach to video copy detection with spatio-temporal post-filtering, 2008 IEEE, 10 pages.
Douze, et al., Inria-Learar's Video copy detection system, TRECVID Workshop—Nov. 2008, 8 pages.
Fleuret, Fast binary feature selection with conditional mutual information, Journal of machine Learning Research 5, Nov. 2004, retrieved at <<http://citeseerx.ist.psu.edu/viewdoc/download?doi=10.1.1.60.8398&rep=rep1&type=pdf>>, 25 pages.
Gionis, et al., Similarity search in high dimensions via hashing, Proceedings of the 25th VLDB Conference, Edinburgh, Scotland, 1999, retrieved at <<http://www.cs.princeton.edu/courses/archive/spr06/cos592/bib/LSH-VLDB-gionis99.pdf>>, 12 pages.
Grauman, et al., The pyramid match kernel: discriminative classification with sets of image features, Proceedings of the Tenth IEEE International Conference on Computer Vision (ICCV 2005), 2005 IEEE, retrieved at <<http://ieeexplore.ieee.org/stamp/stamp.jsp?tp=&arnumber=1544890>>, 8 pages.
Hampapur, et al., Comparison of sequence matching techniques for video copy detection, Proc. SPIE vol. 4676, p. 194-201, Storage and Retrieval for Media Databases 2002, retrieved at <<http://citeseerx.ist.psu.edu/viewdoc/download?doi=10.1.1.92.5157&rep=rep1&type=pdf>>, 8 pages.
Hua, et al., "Robust video signature based on ordinal measure," ICIP 2004. 2004 International Conference on Image Processing, Oct. 24-27, 2004, retrieved at <<http://citeseerx.ist.psu.edu/viewdoc/download?doi=10.1.1.69.8192&rep=rep1&type=pdf>>, 2 pages.
Jegou, et al., "Hamming embedding and weak geometric consistency for large scale image search," Computer Vision—ECCV 2008, Lecture Notes in Computer Science, 2008, vol. 5302/2008, retrieved at <<http://lear.inrialpes.fr/pubs/2008/JDS08/jegou_hewgc08.pdf>>, 15 pages.
Joly, et al., "INTRIA-IMEDIA TRECVID 2008: Video Copy Detection," in TRECVID, 2008, retrieved at <<http://citeseerx.ist.psu.edu/viewdoc/download?doi=10.1.1.159.5291&rep=rep1&type=pdf>>, 12 pages.
Kim, et al., "Spatiotemporal sequence matching for efficient video copy detection," Nov. 8, 2003, retrieved at <<http://ieeexplore.ieee.org/stamp/stamp.jsp?arnumber=01377368>>, 6 pages.
Law-To, et al., "Local Behaviours Labelling for Content Based Video Copy Detection," The 18th International Conference on Pattern Recognition (ICPR 2006), (c) 2006, IEEE, retrieved at <<http://ieeexplore.ieee.org/stamp/stamp.jsp?tp=&arnumber=1699509>>, 4 pages.
Law-To, et al., "Video Copy Detection: a Comparative Study," CIVR 2007, Jul. 9-11, 2007, Amsterdam, The Netherlands, retrieved at <<http://citeseerx.ist.psu.edu/viewdoc/download?doi=10.1.1.73.7399&rep=rep1&type=pdf>>, 8 pages.
Lowe, "Distinctive Image Features from Scale-Invariant Keypoints," International Journal of Computer Vision 60(2), 91-110, 2004, (c) 2004 Kluwer Academic Publishers, The Netherlands, retrieved at <<http://www.springerlink.com/content/h4l02691327px768/fulltext.pdf>>, 20 pages.
Maji, et al., Classification using Interaction Kernel Support Vector Machines is Efficient, IEEE Computer Vision and Pattern Recognition 2008, Anchorage, AK, retrieved at <<http://acberg.com/papers/mbm08cvpr.pdf>>, 8 pages.
Matas, , et al., Randomized RANSAC with Sequential Probability Ratio Test, Proceedings of the Tenth IEEE International Conference on Computer Vision (ICCV 2005), (c) 2005 IEEE.
Poullot, et al., Scalable mining of large video databases using copy detection, MM 2008, Oct. 26-31, 2008, Vancouver, British Columbia, Canada, (c) 2008, 10 pages.
Siersdorfer, et al., Automatic Video Tagging using Content Redundancy, SIGIR 2009, Jul. 19-23, 2009, Boston, Massachusetts, USA, 8 pages.
Sivic, et al., "Video google: a text retrieval approach to object matching in videos," Proceedings of the Ninth IEEE International Conference on Computer Vision I(CCV 2003) (c) 2003 IEEE, retrieved at <<http://www.robots.ox.ac.uk/~vgg/publications/papers/sivic03.pdf>>, 8 pages.
Smeaton, et al., "Evaluation Campaigns and TRECVid," Copyright 2006 Association for Computing Machinery, MIR 2006, Oct. 26-27, 2006, Santa Barbara, California, USA, retrieved at <<http://mediaminer.ict.tno.nl/papers/mir710-Smeaton.pdf>>, 10 pages.
Tan, et al, "Scalable detection of partial near-duplicate videos by visual-temporal consistency," Oct. 19, 2009, retrieved at <<http://vireo.cs.cityu.edu.hk/papers/acmmm09-hktan.pdf>>, 10 pages.
Video near duplicate detection, 2009, retrieved on Nov. 25, 2010 at <<http://ivylab.kaist.ac.kr/demo/VideoNearDuplicateDetection/VideoNearDuplicateDetection.htm>>, 4 pages.
Witten, et al, Data Mining: practical machine learning tools and techniques, (c) 2005, Elsevier Inc., retrieved at <<http://200.201.9.37/mestrado/docs/WittenFrank.pdf>>, 558 pages.
Wu, et al., "A suffix array approach to video copy detection in video sharing social networks," (c) 2009 IEEE, retrieved at <<http://ieeexplore.ieee.org/stamp/stamp.jsp?tp=&arnumber=4960371>>, 4 pages.
Wu, et al., "Beyond the euclidean distance: creating effective visual codebooks using the histogram intersection kernel," 2009 12th International Conference on Computer Vision, Sep. 29-Oct. 2, 2009, pp. 630-637. retrieved at <<http://citeseerx.ist.psu.edu/viewdoc/download?doi=10.1.1.150.324&rep=rep1&type=pdf>>.
Wu, et al., "CC_WEB_VIDEO: Near-duplicate web video dataset," retrieved on November, at <<http://vireo.cs.cityu.edu.hk/webvideo/.>>, pages.
Wu, et al., "Practical elimination of near-duplicates from web video search," MM'07, Sep. 23-28, 2007, Ausburg, Bavaria, Germany, retrieved at <<http://www.cs.cityu.edu.hk/~wuxiao/Research/MM_Web.pdf>>, 10 pages.
Wu, et al., Real-time near-duplicate elimination for web video search with content and context, IEEE Transactions on Multimedia, vol. 11 Issue 2, Feb. 2009, 12 pages.
Zhao, et al., Dynamic texture recognition using local binary patterns with an application to facial expressions, IEEE Transactions on Pattern Analysis and Machine Intelligence, vol. 29, No. 6, Jun. 2007, pp. 915-928.
Zhao, et al., Large-scale near-duplicate web video search: challenge and opportunity, IEEE 2009, 4 pages.

\* cited by examiner

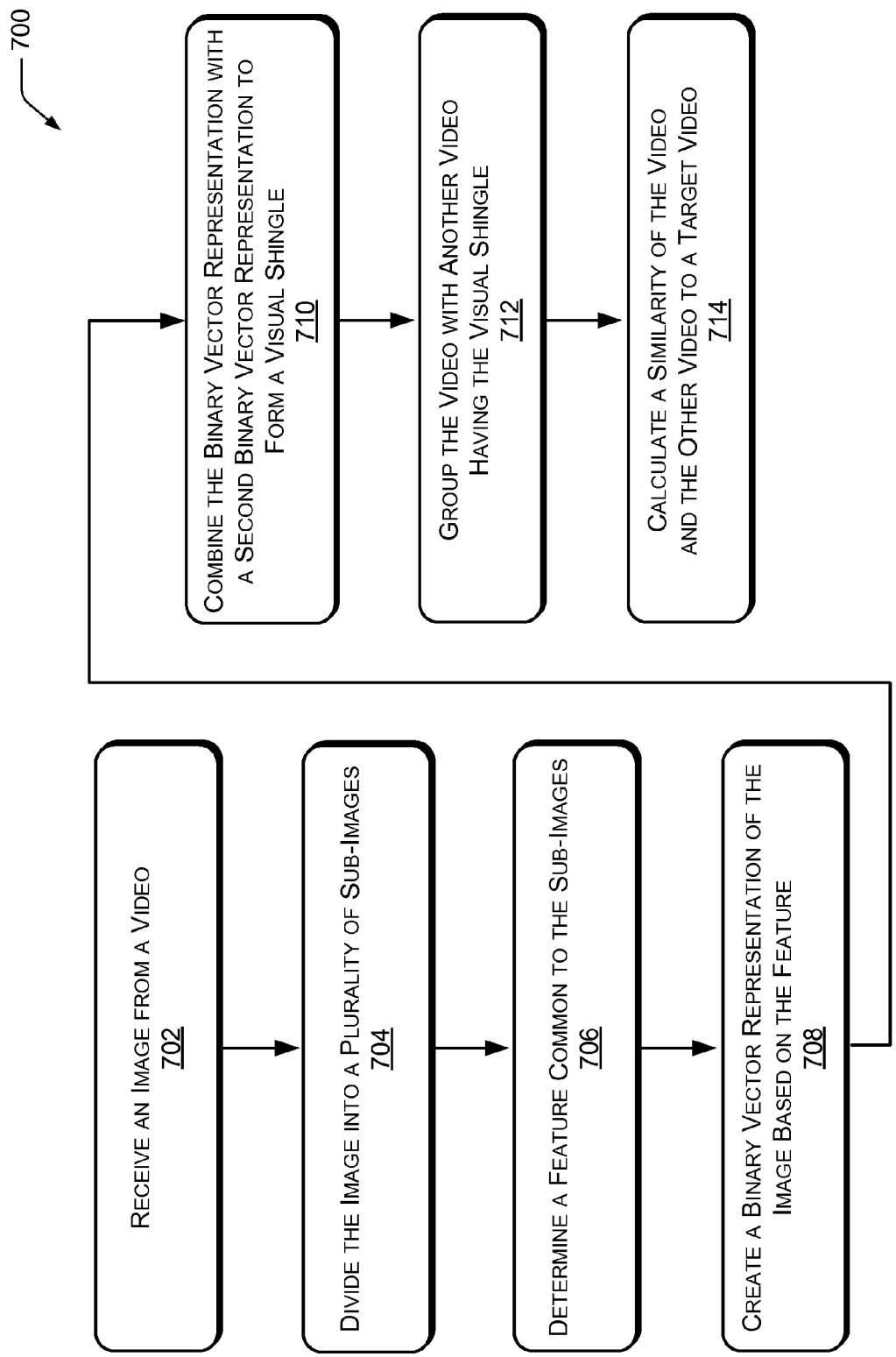

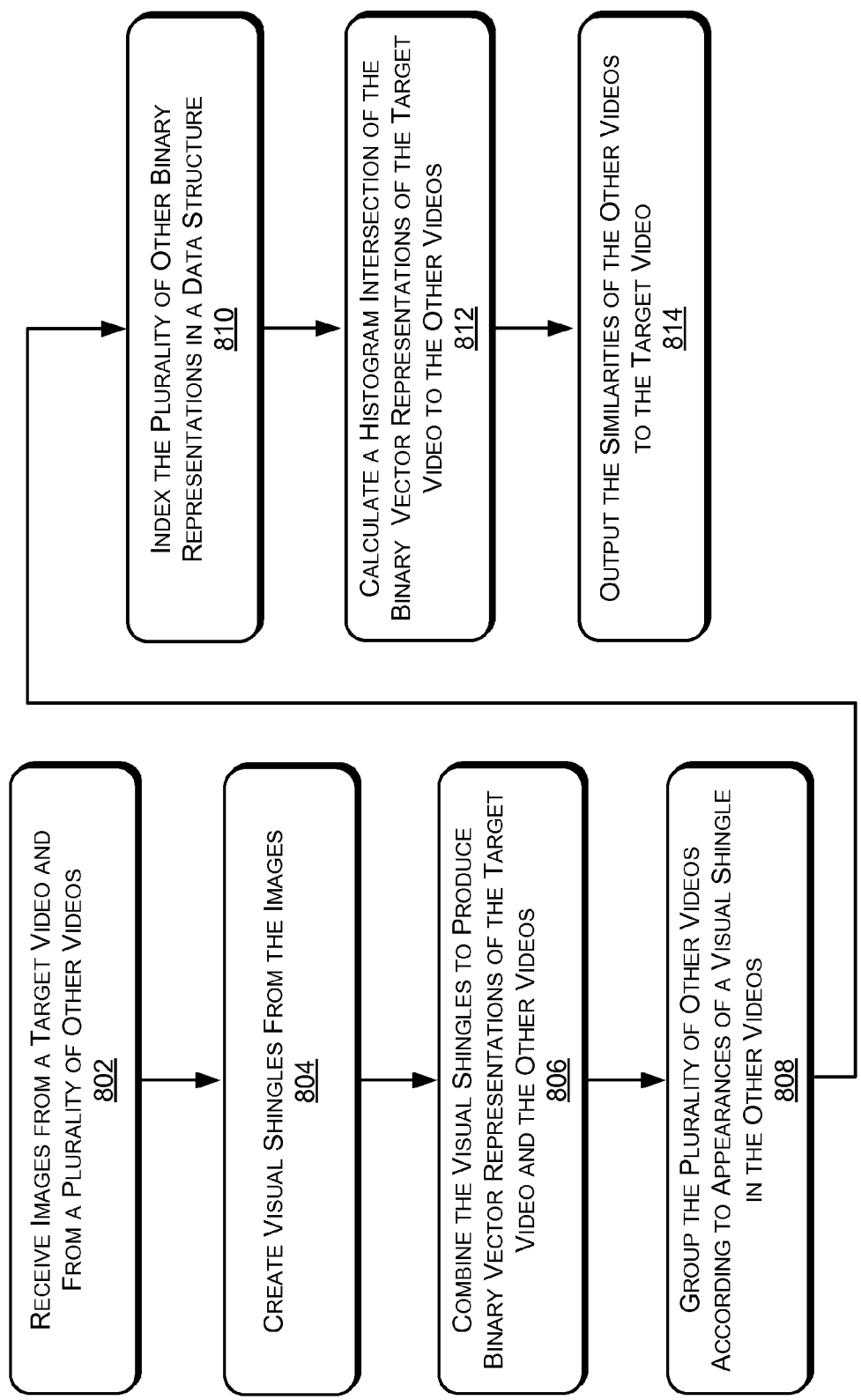

NEAR-DUPLICATE VIDEO RETRIEVAL

BACKGROUND

Recent years have witnessed an explosive growth of multimedia data including images and videos readily available on the Internet. With the exponential growth of video sharing websites (e.g., YouTube™, Google Videos™, Yahoo™ Video, etc.) the number of videos searchable on the Web has tremendously increased. However, much of the media content available is redundant, overlapping, or contains duplicate material. Organizing videos on the Internet, to avoid duplicates or to perform research regarding duplicates, still remains a challenge to researchers in the multimedia community.

Much of the difficulty regarding organizing (e.g., indexing, cataloging, annotating, ranking, etc.) videos on the Internet involves problems with efficiency and with scalability. Most of the work in the area of near-duplicate video detection focuses on handling various photometric or geometric transformations. These techniques are not well equipped to handle a Web-scale video database and return search results in real time. Additionally, manual annotation and organization of videos represents a very labor intensive and time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the application describes automatically determining a similarity of a video (or a plurality of videos) to another video (for example, a target video). The determining includes creating visual shingles from received images of the target video and the other videos and combining the visual shingles to produce binary representations of the target video and the other videos. The determining further includes grouping the plurality of videos according to the number of appearances of one or more of the visual shingles in the videos. The binary representations of the videos are indexed based on the grouping of the videos that they represent. The determining also includes calculating a histogram intersection of the binary vector representations of the target video with the other videos, in a sequence based on the indexing, and outputting the similarities of the plurality of videos to the target video based on the results of the histogram intersections.

In alternate embodiments, techniques may be employed to create the binary representations, including techniques that leverage a common feature of images received from the videos. This may include dividing the images into sub-images, and ranking the sub-images according to the common feature. Binary vector representations can be produced based on relationships among individual ranked sub-images and among combinations of the ranked sub-images.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 7 illustrates an example methodology of determining the similarity of a video to a target video, according to an example embodiment.

FIG. 8 illustrates an example methodology of determining the similarity of one or more videos to a target video, according to another example embodiment.

DETAILED DESCRIPTION

Overview

Various techniques for determining a similarity of a video (or a plurality of videos) to another video (for example, a target video) are disclosed. Determining a similarity of one or more videos to a target video may include near-duplicate video detection techniques. For ease of discussion, this disclosure describes various techniques with respect to a similarity between two videos. However, the descriptions also may be applicable to determining a similarity of multiple videos to each other or a similarity of one or more videos to one or more identified (i.e., target) videos.

In some implementations, near-duplicate video detection can be accomplished using the following techniques. A video may be segmented into shots. For example, a shot may include a video sequence, a cohesive group of video sequences, or the like. The shots can be represented by one or more images (i.e., frames, key frames, etc.). A set of multi-dimensional feature vectors can be extracted from the images, and arranged to represent the images individually. The multi-dimensional feature vectors, taken together to represent all of the images of the video, may be arranged to form a "bag of image features," where the bag of features represents the whole video. A similarity between videos may be computed by matching image features under spatial and temporal constraints. For example, multiple videos may contain common images (and/or their corresponding feature vectors). Videos containing common images or feature vectors may be determined to be similar, based on the occurrence of the images within the videos.

Among the elements of the forgoing techniques, efficiencies in near-duplicate video detection may be gained by improvements to compact video representation and/or to image matching under spatiotemporal constraints. Improvements to compact video representation may include techniques to represent a video or to represent images from a video for more efficient analysis of similarities between the videos or images. For example, a video or an image may be represented by one or more binary sequences, as discussed in detail below. Analyses of the binary sequences may be more efficient than analyses of the videos or images themselves. Improvements to image matching under spatiotemporal constraints may include techniques to improve the efficiency of determining whether an image or a series of images in one video are similar to images in another video, including in terms of temporal sequences of images. For example, one or more of the binary sequences may be combined to form binary representations that include spatial information and temporal information regarding videos or images being represented, as discussed in detail below. The spatial and temporal information inherent in the binary representations may provide similarity results that are more accurate and reliable.

Example System

Figure 1:
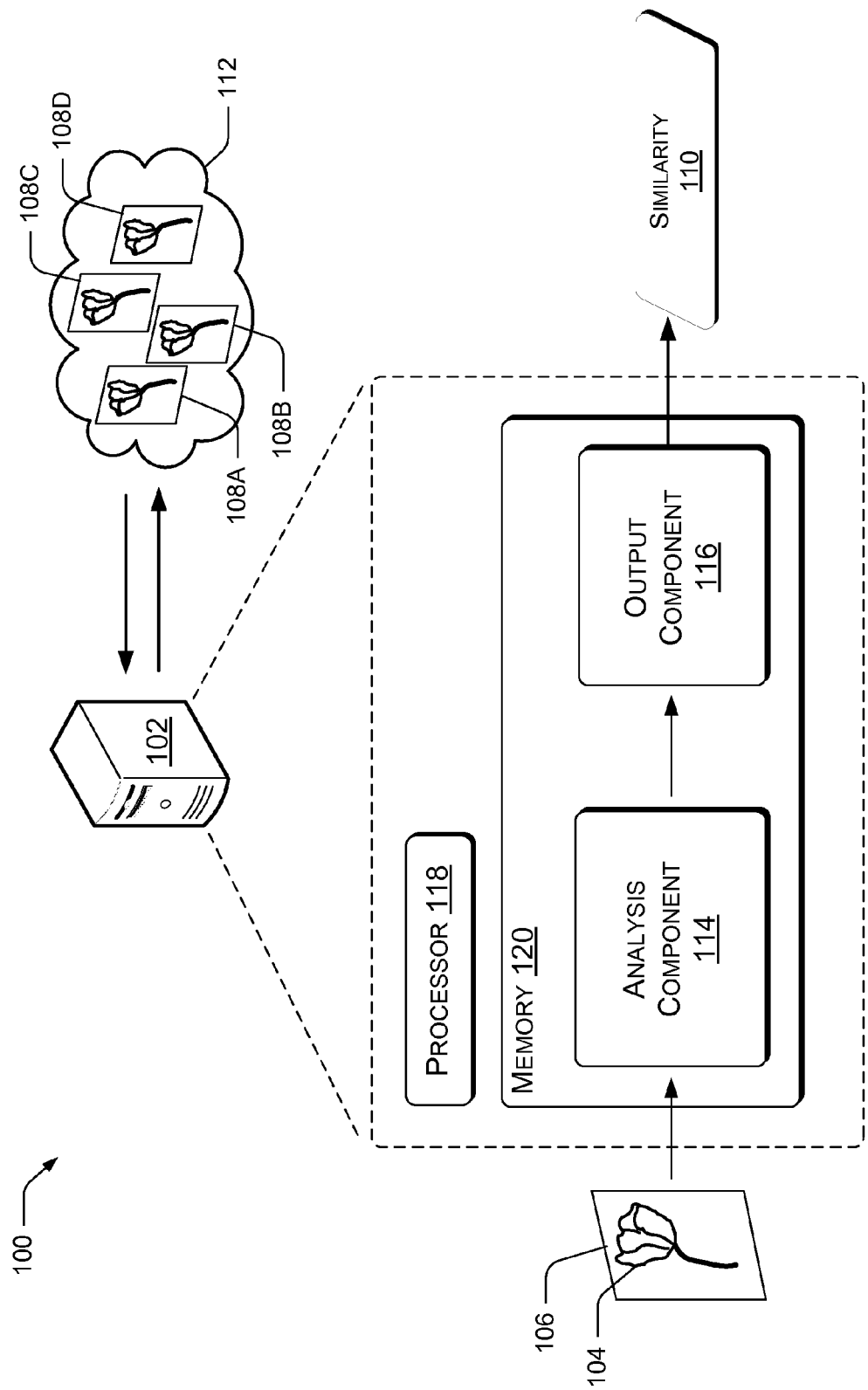
FIG. 1 is a block diagram of a system that determines a similarity of a video to another video, including example system components, according to an example embodiment.

In general, features that are common to images extracted from videos may be leveraged to determine a similarity of one or more videos to an identified (i.e., target) video. FIG. 1 is a block diagram of an arrangement 100 that is configured to determine a similarity of a first video to a second video, according to an example embodiment. In one embodiment, a system 102 analyzes features of an image 104 from a video 106 to determine a similarity of the video 106 to one or more videos 108.

As shown in the illustration, example inputs to the system 102 include a video 106, which may be submitted by a user or identified by the user from a corpus of videos, for example. The video 106 submitted or identified by the user is referred to in this example as the "target" video. In the example embodiment of FIG. 1, the system 102 may receive one or more images 104 from the target video 106. In alternate embodiments, the system 102 may extract the image 104 from the video 106. In one embodiment, an image 104 is a key frame from the video 106. For example, the image 104 may be representative of a shot or a sequence from the video 106. In another embodiment, the system 102 may receive uniform sampled images from the video 106 over time. For example, a fixed number of frames per unit time may be received or extracted, (e.g., receiving one frame per second, etc.). In some embodiments, receiving uniform sampled images may better preserve reliable temporal information from the video 106.

Additional example inputs include one or more potentially similar videos 108 (shown as 108A-108D) which may be obtained from a corpus of videos, for example, via the Internet. While FIG. 1 shows four potentially similar videos 108A-108D, in alternate embodiments, the system 102 may receive fewer or greater numbers of potentially similar videos 108, including hundreds or thousands of potentially similar videos 108. The number of potentially similar videos 108 received may be a function of the number of potentially similar videos that have been posted to the Internet, for example.

Example outputs of the system 102 include a similarity 110 (i.e., a similarity of one or more videos 108 to the target video 106), which may be in a number of forms (e.g., a rank, a percentage, a score, etc.). In alternate embodiments, fewer or additional inputs may be included (e.g., feedback, constraints, etc.). Additionally or alternatively, other outputs may also be included, such as a relative ranking of the similarity of each of the videos 108 to the target video 106, or the like.

In one embodiment, the system 102 may be connected to a network 112, and may search the network 112 for potentially similar videos 108 to the video 106. In alternate embodiments, the network 112 may include a network (e.g., wired or wireless network) such as a system area network or other type of network, and can include several nodes or hosts, (not shown), which can be personal computers, servers or other types of computers. In addition, the network can be, for example, an Ethernet LAN, a token ring LAN, or other LAN, a Wide Area Network (WAN), or the like. Moreover, such network 112 can also include hardwired and/or optical and/or wireless connection paths. In an example embodiment, the network 112 includes an intranet or the Internet.

In one embodiment, as illustrated in FIG. 1, the system 102 is comprised of an analysis component 114 and an output component 116. In alternate embodiments, the system 102 may be comprised of fewer or additional components and perform the discussed techniques within the scope of the disclosure.

All or portions of the subject matter of this disclosure, including the analysis component 114 and/or the output component 116 (as well as other components, if present), can be implemented as a system, method, apparatus, and/or article of manufacture using standard programming and/or engineering techniques to produce software, firmware, hardware or any combination thereof to control a computer or processor to implement the disclosure. An example system 102 may be implemented using any form of computer-readable media (shown as Memory 120 in FIG. 1) that is accessible by one or more processors 118. Processor(s) 118 may include, for example, general purpose central processing units (CPU), graphics processing units (GPU), or other general and/or special purpose processors. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device, such as processor(s) 118.

In contrast, communications media may embody computer readable instructions, data structures, program modules, or other data in a modulated data signal, such as a carrier wave, or other transmission mechanism. As defined herein, computer storage media does not include communications media.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

In one example embodiment, as illustrated in FIG. 1, the system 102 receives a first video 106 (i.e., a target video) having an image 104. If included, the analysis component 114 (as shown in FIG. 1) receives the first video 106 having the image 104. The image 104 may represent a frame of the video 106, including a key frame, for example. In some embodiments, the analysis component 114 may receive multiple images 104 representing multiple frames from the video 106.

Example Video Analysis

Figure 2:
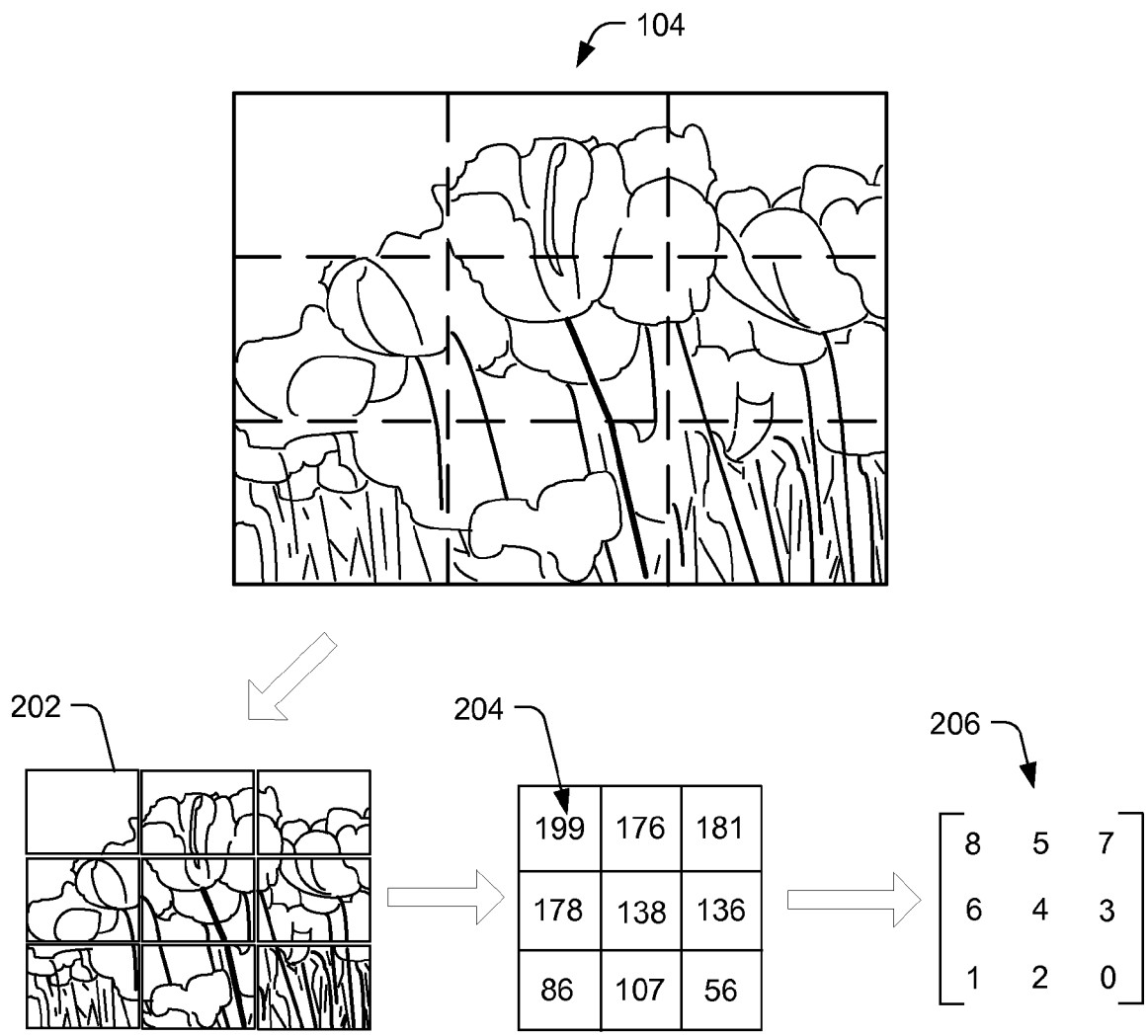
FIG. 2 is a schematic diagram of an example image received from a video, where the image is sub-divided and ranked, according to an example embodiment.

An example image 104 is shown in FIG. 2. In an embodiment, the analysis component 114 divides (i.e., partitions) the image 104 into multiple sub-images 202. In the example shown in FIG. 2, the image 104 is divided into a two-dimensional matrix of sub-images 202 (a 3×3 matrix, in this example), comprising nine sub-images 202. In alternate embodiments, the analysis component 114 may divide the image 104 into fewer sub-images or a greater number of sub-images.

In an implementation, the analysis component 114 determines a feature that is common to each of the sub-images 202 of the image 104. In alternate embodiments, the common feature is a local feature, a global feature, or the like. For example, in an embodiment, the analysis component 114 may determine one or more local features describing details of each of the sub-images 202, such as objects within the image 104 and the sub-images 202, lines and/or shapes of the objects, and the like.

In an alternate embodiment, the analysis component 114 determines one or more global features representing global characteristics of the sub-images 202. Global features may include spatial, color, or temporal information that is common to each of the sub-images 202. For example, in one instance, a global feature representing gray-level intensity information is determined, as described herein. In an example, gray-level intensity includes a relative amount or intensity of gray (e.g., darkness, contrast, etc.) within an image 104 or a sub-image 202. If a sub-image 202 contains black-and-white information and color information, then the gray-level intensity may correspond to the average amount of black-and-white information within the sub-image 202. As compared to other sub-images 202, one sub-image 202 may be ranked or scored as having greater or lesser relative gray-level intensity than another other sub-image 202, if it contains more or less overall darkness respectively.

In an embodiment, the analysis component 114 ranks the sub-images 202 based on the common feature. For example, as shown in FIG. 2, each of the sub-images 202 may be given a score 204 by the analysis component 114, based on the relative gray-level intensity of the sub-image. In the example of FIG. 2, a sub-image 202 with a greater gray-level (i.e., darkness, etc.) is scored higher than a sub-image 202 with a lesser gray-level. Alternately, in other implementations, a sub-image 202 with a greater gray-level may be scored lower than a sub-image 202 with a lesser gray-level. Further, in some embodiments, each of the sub-images 202 may be ranked as shown by the matrix 206, with the rankings corresponding to the scores 204 associated with each of the respective sub-images 202.

Application of scores 204 and/or rankings (as shown by the matrix 206) may be useful in making comparisons and showing relationships (e.g., ordinal relationships) between the sub-images 202. For example, ordinal measure describes the pairwise ordinal relations between sub-images 202. In one example, the relations are in terms of average gray-level values. In an example embodiment, a frame may be divided into nine sub-images 202, resulting in a total of 36 (i.e. $C_9^2$) ordinal relations among the nine sub-images 202. The ordinal measure can be rewritten in the form of a 36-dimensional binary feature vector (i.e. $\{0,1\}^{36}$). Let the set $A_a = \{A_a^1, \ldots, A_a^{36}\}$ denote the 36 ordinal relations, with $A_a^i$ as the i-th ordinal relation. To get a more compact and robust frame-level representation, feature selection may be implemented on the 36 ordinal relations. Let $A_a^s = \{A_a^{s(1)}, \ldots, A_a^{s(K)}\}$ denote K features extracted during the feature selection process.

Feature selection algorithms may be employed with various machine learning models (e.g. classification) and applications (e.g. face recognition) to select appropriate features for large scale near-duplicate video retrieval. Two example methods to extract ordinal relations from the set $A_a$ are discussed herein. The first example is a method that aims to preserve as much information as possible without considering background knowledge. This example method uses conditional entropy to measure information loss, with the resulting feature referred to as a CE-based spatiotemporal feature. The second example is a heuristic method that is based on observations of near-duplicate videos, specifically local binary patterns.

Conditional Entropy Based Method

The first ordinal relations selection method is based on conditional entropy, so some introductions to basic quantities in information theory are presented. According to the method, an important quantity of information is entropy, i.e. the information in a random variable. Given a discrete random variable X that consists of several events x, which occurs with probability p(x), the entropy of X may be defined as:

$$H(X) = -\Sigma_x p(x) \log p(x), \quad (1)$$

which is a measure of the amount of uncertainty associated with the value of X. The joint entropy of two discrete random variables X and Y is merely the entropy of their pairing (X, Y) and is defined as:

$$H(X,Y) = -\Sigma_{x,y} p(x,y) \log p(x,y), \quad (2)$$

where p(x, y) is the joint probability of random variables X and Y. The conditional entropy can be obtained with the formula:

$$H(X|Y) = H(Y|X) - H(Y), \quad (3)$$

which quantifies the remaining uncertainty of the random variable X given that the value of Y is known.

In an embodiment, a goal of feature selection is to select a subset of features that carries as much information as possible. From the view point of information theory, the goal of feature selection is to minimize the conditional entropy $H(A_a|A_a^s)$, which quantifies the remaining uncertainty of $A_a$ after giving selected ordinal relations. If selected ordinal relations contain all the information embedded in $A_a$, then the conditional entropy is zero, since no more information is required to describe $A_a$ when the selected ordinal relations are known. Estimating the conditional entropy may be time-consuming, since it requires the estimation of $2^K$ discrete probabilities of a large set of samples, e.g. when the number of extracted images of the dataset is more than two million. Furthermore, the number of possible choices of a selected ordinal relation set is very large. For example, if the value of K is 12, there will be $C_{36}^{12} \approx 1.25 \times 10^9$ possible choices. Thus, minimization may be computationally intractable.

However, an efficient ordinal relation selection method may be implemented that ensures selected ordinal relations which are both individually informative and two-by-two weakly dependant.

The procedure of ordinal relation selection may be summarized in the following example algorithm (based on the example above):
Require: The binary N×36 matrix F, and the number of features to be selected K.
Ensure: The K individually informative and two-by-two weakly dependent features $A_a^{s(1)}, A_a^{s(2)}, \ldots, A_a^{s(K)}$.
(Step 1) Initialize the set $A_a^S$ and $A_a^C$.
$s(1) = \text{argmax}_n H(A_a^n)$
$A_a^S = \{A_a^{s(1)}\}$
$A_a^C \leftarrow A_a - A_a^S$
(Step 2) Iteratively select ordinal relations.
for k=1 to (K−1) do $$s(k+1) = \text{argmax}_n \{\min_{l \leq k} H(A_a^n | A_a^{s(l)})\}, A_a^n \in A_a^C$$

$A_a^S \leftarrow A_a^S \cup \{A_a^{s(k+1)}\}$
$A_a^C \leftarrow A_a - A_a^S$
end for.

With regard to the example algorithm, the binary matrix $F \in \mathbb{R}^{N \times 36}$ records the ordinal relations for each extracted image 104, where N is the total number of extracted images 104 for a video database and $F_{i,j} \in \{0,1\}$ represents the value of feature $A_a^j$ for the i-th image 104. $A_a^S$ and $A_a^C$ represent the selected ordinal relation set and candidate set, respectively. $A_a^{s(i)}$ denotes the i-th selected ordinal relation. $A_a^{c(i)}$ denotes the i-th candidate ordinal relation. In the first step of the example algorithm above, $A_a^s$ is initialized as the most informative ordinal relation, which is $H(A_a^{s(1)}) \geq H(A_a^i)$ for $1 \leq i \leq 36$. From the definition of entropy (as described above, the entropy of the i-th feature $A_a^i$ may be calculated by the equation:

$$H(A_a^i) = -p(A_a^i=1) \log p(A_a^i=1) - p(A_a^i=0) \log p(A_a^i=0) \quad (4)$$

where $p(A_a^i=1)$ is the probability of the value of feature $A_a^i$ to be one and is approximated by the relative frequency:

$$p(A_a^i = 1) = \frac{\#(\text{frames with the } i\text{-th feature having value 1})}{N} \quad (5)$$

and $p(A_a^i=0) = 1 - p(A_a^i=1)$ under the assumption that the N frames are independent. In an embodiment, the method uses a "bag-of-words" model and the probabilistic dependence of neighboring images is not considered, satisfying the assumption.

In Step 2, ordinal relations are iteratively selected. The (k+1)-th ordinal relation is selected as:

$$s(k+1) = \text{argmax}_n \underbrace{\{\min_{l \leq k} H(A_a^n | A_a^{s(l)})\}}_{v(n,k; A_a, A_a^S)}, A_a^n \in A_a^C \quad (6)$$

where $H(A_a^n | A_a^{s(l)})$ is the entropy of $A_a^n$ conditional on $A_a^{s(l)}$. This conditional entropy is low if either feature is not informative or if its information was already caught by $A_a^{s(l)}$. For a given candidate ordinal relation $A_a^n$, the smaller the value of $v(n, k; A_a, A_a^s)$ the more information is shared between $A_a^n$ and at least one of the already selected ordinal relations. Maximizing $v(n, k; A_a, A_a^s)$ ensures the newly selected feature is both informative and weakly dependent on the preceding ones. The calculation of $H(A_a^n | A_a^{s(l)})$ involves the joint distribution of the two binary variables $A_a^n$ and $A_a^{s(l)}$. From the whole procedure, the maximal number of joint distributions in this example may be calculated to be 630 (i.e. 36×35×0.5), thus showing an efficient implementation of ordinal relation selection.

The top eight informative features derived from the example method above may be used to represent an image. The mapping functions for translating an image (such as image 104, for example) into an 8-dimensional binary feature may be represented as:

$$\mathcal{F}_{info} = \{I(G_{(1,2)} > G_{(2,2)}), I(G_{(1,1)} > G_{(1,3)}), \ldots, I(G_{(1,3)} > G_{(3,1)}), I(G_{(1,2)} > G_{(1,3)})\} \quad (7)$$

where function I(S) is an indicator function giving 1 if statement S is true and 0 otherwise, $G_{(i,j)}$ represents, for example, the average gray-level intensity value of the (i,j)-th sub-image, where ($1 \leq i, j \leq 3$). In an embodiment, the parameter κ may be set empirically. After getting an image-level representation, the temporal structure of a video may be modeled.

In one embodiment, the w-shingling concept of text retrieval may be used to model the temporal information. A w-shingling is a set of unique "shingles", i.e. contiguous subsequences of tokens in a document, that can be used to gauge the similarity of two documents. For example, the document "a rose is a rose is a rose" can be tokenized as (a, rose, is, a, rose, is, a, rose). The set of all unique contiguous sequences of 4 tokens is {(a, rose, is, a), (rose, is, a, rose), (is, a, rose, is)} which forms a 4-shingling. A spatiotemporal signature may be similar to a word shingle, except each token is not a word but a K-dimensional binary pattern. In one implementation, w may be set to 2. Consequently, the binary pattern of a video may be decomposed into a set of visual shingles. A histogram of visual shingles may be used as the bag of visual shingle (BoVS) representation for a video being represented. In this implementation, the size of visual shingle vocabulary is $2^{2 \times K}$.

Thus, in the example method, the mapping functions $\mathcal{F}_{info}$ may act as hash functions to transform images into binary numbers and encode spatiotemporal information into a binary representation of a video. With this method a one-time scan of the binary representation can accomplish quantization. Additionally, the compact binary representations may be saved in this compact form to reduce storage cost.

Local Binary Pattern Based Method

Figure 3:
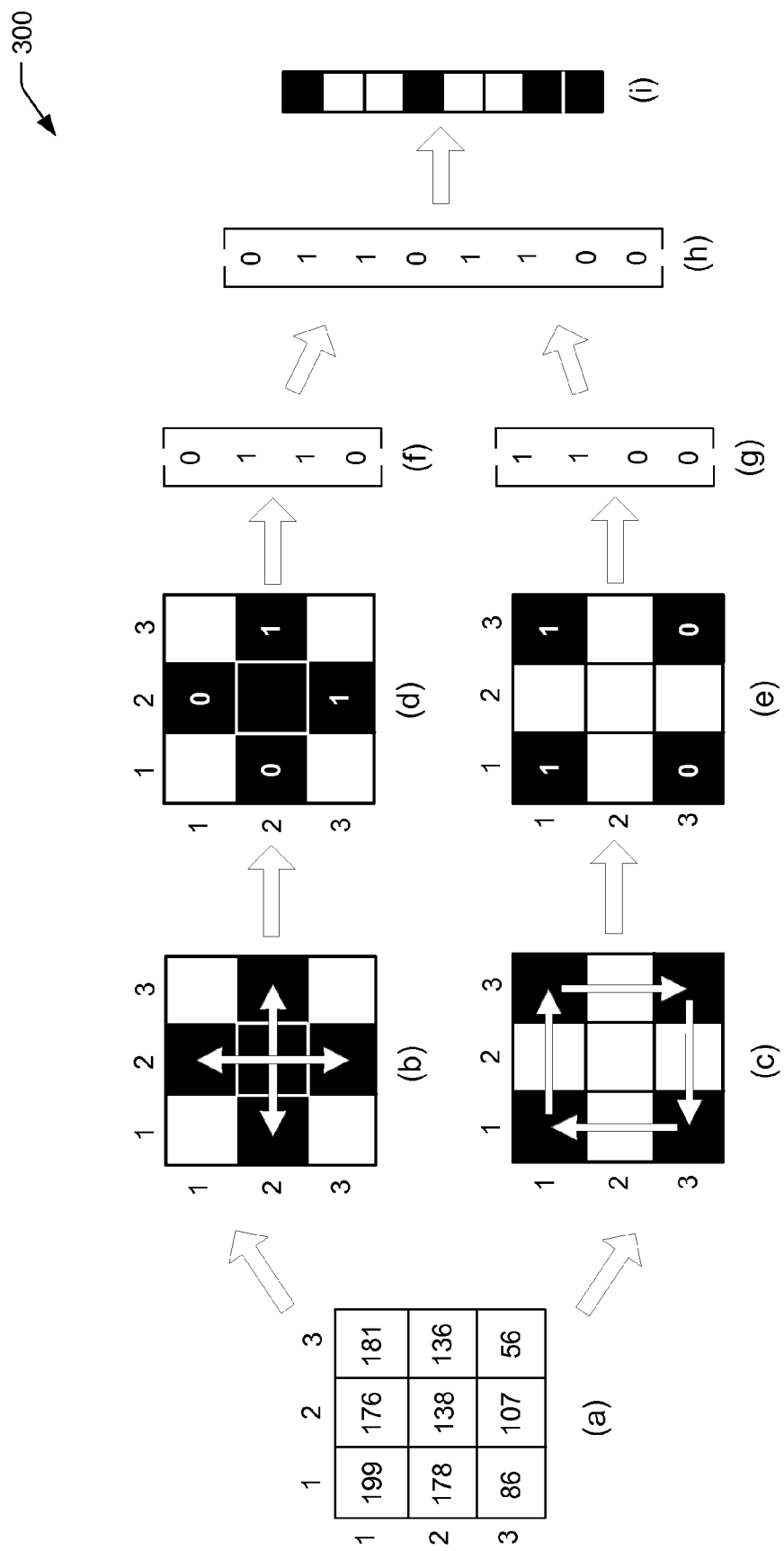
FIG. 3 is a schematic diagram of one example technique of the system of FIG. 1, including using ordinal relationships of a ranked image to create a binary representation of the image, according to an embodiment.

FIG. 3 is a schematic diagram of one example technique of the system 102, including using ordinal relationships of a ranked image to create a binary representation of the image 104. The example ranked sub-images 202 from FIG. 2, including the scores 204, are shown in FIG. 3 at (a). The resulting binary representation of the image 104 is shown in FIG. 3 at (h) and (i). The intermediate steps that lead from a divided and ranked image 104 to a binary representation are shown in FIG. 3 with respect to (b), (c), (d), (e), (f), and (g).

In one embodiment, the analysis component 114 is configured to compare an intensity value of a first sub-image and a second sub-image, and assign binary values to one or more of the sub-images, based on the comparison. The analysis component 114 evaluates pairwise ordinal relationships between the sub-images in terms of the common feature. For example, the analysis component 114 may compare an intensity value (i.e., a common feature such as a gray-level intensity, for example) of a first sub-image and a second sub-image, and assign the first sub-image a 1 value when the intensity value of the first sub-image is greater than the intensity value of the second sub-image, and assign the first sub-image a 0 value when the intensity value of the first sub-image is less than the intensity value of the second sub-image. In one example, as shown in FIG. 3, the analysis component 114 makes the comparison in two separate tracks. In an example, the analysis component 114 combines the two tracks to form a binary representation of the image 104.

For ease of discussion, the matrices representing the image 104, divided and ranked as discussed with respect to FIG. 2, have been illustrated with coordinates in FIG. 3. For the purposes of this discussion, coordinates will be referred to in the form (row, column). In an embodiment, the analysis component 114 makes the intensity comparison in a first track based on ordinal relationships of centrally arranged sub-images. As shown in the example illustrated in FIG. 3 at (b), the centrally arranged sub-images 202 are identified (shown as darkened squares). In general, the central portion of an image 104 contains the main content of an image 104 (and thus, a video 106, 108). The centrally arranged sub-images include the central sub-image (at coordinates (2,2)) and the centrally arranged sub-images located on the perimeter of the image (at coordinates (1,2), (2,1), (2,3), and (3,2)). In an alternate embodiment including a greater or lesser number of sub-images 202, the centrally arranged sub-images would include such central sub-image and centrally arranged sub-images located on the perimeter as resulting from the number of sub-images.

The analysis component 114 compares the rank of the central sub-image (at (2,2)) to the rank of each of the centrally arranged sub-images located on the perimeter of the image. As shown in FIG. 3 at (b) and (d), the analysis component 114 assigns a binary low value (e.g., a "0") to a centrally arranged sub-image located on the perimeter when the central sub-image is lower in rank than the centrally arranged sub-image located on the perimeter. This is illustrated by the comparison of the central sub-image (at (2,2) to the centrally arranged sub-image located at (1,2). The value of the central sub-image (at (2,2)) is 138 and the value of the centrally arranged sub-image located at (1,2) is 176. Since 138 is lower than 176, the sub-image at (1,2) is assigned a binary low value (e.g., a "0").

As also shown in FIG. 3 at (b) and (d), the analysis component 114 assigns a binary high value (e.g., a "1") to a centrally arranged sub-image located on the perimeter when the central sub-image is higher in rank than the centrally arranged sub-image located on the perimeter. This is illustrated by the comparison of the central sub-image (at (2,2)) to the centrally arranged sub-image located at (2,3). The value of the central sub-image (at (2,2)) is 138 and the value of the centrally arranged sub-image located at (2,3) is 136. Since 138 is higher than 136, the sub-image at (2,3) is assigned a binary high value (e.g., a "1").

In an embodiment, the analysis component 114 makes comparisons and assigns binary values for each of the centrally arranged sub-images located on the perimeter of the image. As shown in FIG. 3 at (f), the analysis component 114 captures the assigned binary high and low values in a vector form to create a central binary vector feature. In the example shown at (f) in FIG. 3, the central binary vector feature comprises four binary values. In alternate embodiments, where the image 104 is divided into a greater or lesser number of sub-images 202, the central binary vector feature may be comprised of more or less binary values.

In an embodiment, the analysis component 114 makes the intensity comparison in a second track based on ordinal relationships of marginally arranged sub-images. As shown in the example illustrated in FIG. 3 at (c), the marginally arranged sub-images 202 are identified (shown as darkened squares). The marginally arranged sub-images include the marginally arranged sub-images located on the perimeter of the image (at coordinates (1,1), (1,3), (3,1), and (3,3)). In an alternate embodiment including a greater or lesser number of sub-images 202, the marginally arranged sub-images would include such marginally arranged sub-images located on the perimeter as resulting from the number of sub-images.

The analysis component 114 compares the rank of each marginally arranged sub-image to the rank of an adjacent marginally arranged sub-image. In making the comparisons, a direction may be established, such as a clockwise direction, as shown in FIG. 3 at (c). In other embodiments, a counter-clockwise direction may be used instead. As shown in FIG. 3 at (c) and (e), the analysis component 114 assigns a binary high value (e.g., a "1") to a marginally arranged sub-image when the marginally arranged sub-image is higher in rank than the adjacent marginally arranged sub-image. This is illustrated by the comparison of the marginally arranged sub-image at (1,1) to the marginally arranged sub-image located at (1,3). The value of the marginally arranged sub-image at (1,1) is 199 and the value of the marginally arranged sub-image at (1,3) is 181. Since 199 is higher than 181, the sub-image at (1,1) is assigned a binary high value (e.g., a "1").

As also shown in FIG. 3 at (c) and (e), the analysis component 114 assigns a binary low value (e.g., a "0") to a marginally arranged sub-image when the marginally arranged sub-image is lower in rank than the adjacent marginally arranged sub-image. This is illustrated by the comparison of the marginally arranged sub-image at (3,1) to the marginally arranged sub-image at (1,1). The value of the marginally arranged sub-image at (3,1) is 86 and the value of the marginally arranged sub-image at (1,1) is 199. Since 86 is lower than 199, the sub-image at (3,1) is assigned a binary low value (e.g., a "0").

In an embodiment, the analysis component 114 makes comparisons and assigns binary values for each of the marginally arranged sub-images of the image. As shown in FIG. 3 at (g), the analysis component 114 captures the assigned binary high and low values in a vector form to create a marginal binary vector feature. In the example shown at (g) in FIG. 3, the marginal binary vector feature comprises four binary values. In alternate embodiments, where the image 104 is divided into a greater or lesser number of sub-images 202, the marginal binary vector feature may be comprised of more or less binary values.

In an embodiment, the analysis component 114 concatenates the central binary vector feature and the marginal binary vector feature to create the binary vector representation of the image 104. This is illustrated in FIG. 3, where the central binary vector feature at (f) is concatenated to the marginal binary vector feature at (g) to form the binary vector representation of the image 104 at (h). Thus, the technique described herein that forms the binary vector representation (h) is a mapping function that acts as a hashing function to transform images (such as image 104) into binary values with encoded spatiotemporal information. In alternate embodiments, the binary vector representation of the image 104 may be comprised of greater or fewer binary values. In some alternate embodiments, the binary vector representation of the image 104 may be comprised of one or the other of the central binary vector feature or the marginal binary vector feature alone, or be comprised of partial forms of one or both.

Accordingly, in an embodiment as illustrated in the example of FIG. 3, the analysis component 114 may create a binary representation of the image 104 (such as the binary vector representation in FIG. 3 at (h)) based on ranking the sub-images 202. In various embodiments, the binary representation of the image 104 comprises a multi-dimensional binary vector representing rank relationships between centrally arranged sub-images, marginally arranged sub-images, or a combination of centrally arranged sub-images and marginally arranged sub-images. In alternate embodiments, the binary representation of the image 104 may be comprised of binary values obtained from other relationships relative to the sub-images 202 (e.g., alternate comparisons of ranks or scores of sub-images, based on one or more other common features, dividing images differently, etc.).

In some embodiments, the binary representation of the image 104 may be presented in various forms, such as the arrangement shown in FIG. 3 at (i). The form with which the binary representation of the image 104 is presented may facilitate discussion of applications of the binary representation of the image 104, as is discussed further. In an example, as shown in FIG. 3 at (i), the binary values maintain their order (as shown at (h)), however, the binary "0's" are shown as black squares and the binary "13 s" are shown as white squares. In alternate examples, the binary "1's" may be shown as black squares and the binary "0's" may be shown as white squares, or the binary values may be presented in any number of other forms.

Figure 4:
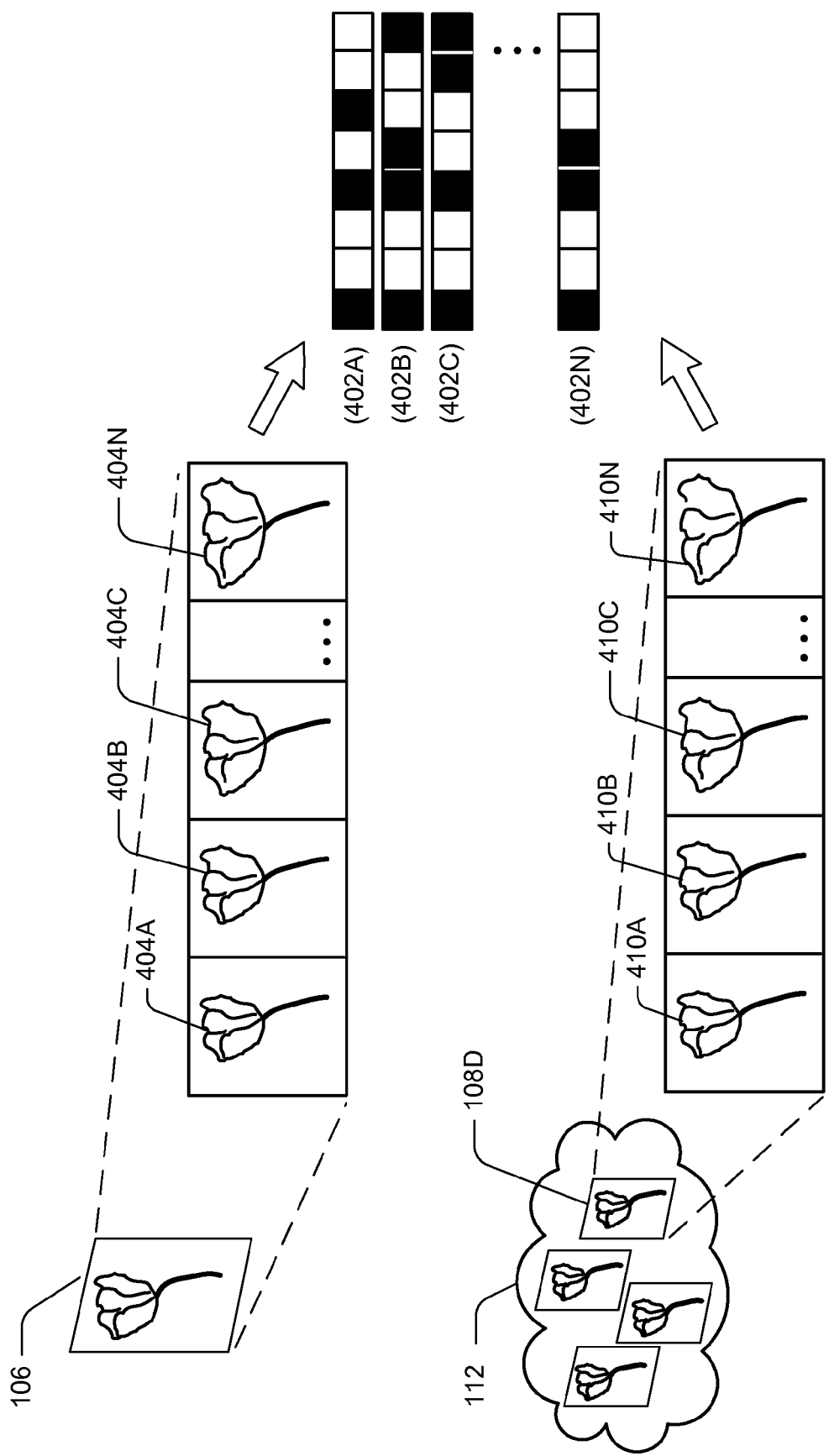
FIG. 4 is a schematic diagram of an example result of the technique of FIG. 3, according to an embodiment. Images from a target video, for example, and images from another video are shown to include similar or identical binary representations.

FIG. 4 is a schematic diagram of an example result of the technique of FIG. 3, according to an embodiment. Images from a target video 106 and images from another video 108 (shown as 108D, for example) are shown to include similar or identical binary representations. Video 106 is shown with four example images (such as image 104) that represent portions of the video 106. Using the techniques described with regard to FIG. 3, binary representations 402A, 402B, 402C, and 402N represent images 404A, 404B, 404C and 404N respectively. In various embodiments, any number of images from a video may be represented by a binary representation. In an implementation, the binary representations of the images may be arranged in a temporal order. For example, the binary representation 402A represents a temporally earlier image 404A and the binary representation 402N represents a temporally later image 404N.

Similarly, a video 108 (such as 108D, for example), as described with respect to FIG. 1, may be comprised of a number of images 410 (shown as 410A-410N). Using the techniques described with regard to FIG. 3, binary representations 402A, 402B, 402C, and 402N may also represent images 410A, 410B, 410C and 410N respectively. This is true when the images 404A, 404B, 404C and 404N are the same as the images 410A, 410B, 410C and 410N respectively. Since the binary representations 402 are based on a common feature of the images 404 and 410 (such as gray-level intensity, for example), the images 404A, 404B, 404C and 404N and the images 410A, 410B, 410C and 410N respectively need not be identical, but they are likely similar, and may be near-duplicates. Accordingly, in some examples, common images or near-duplicate images may be included in multiple videos (such as videos 106 and 108, for example). Additionally, the common images or near-duplicate images may be arranged in the multiple videos in a similar, if not identical, temporal order.

Figure 5:
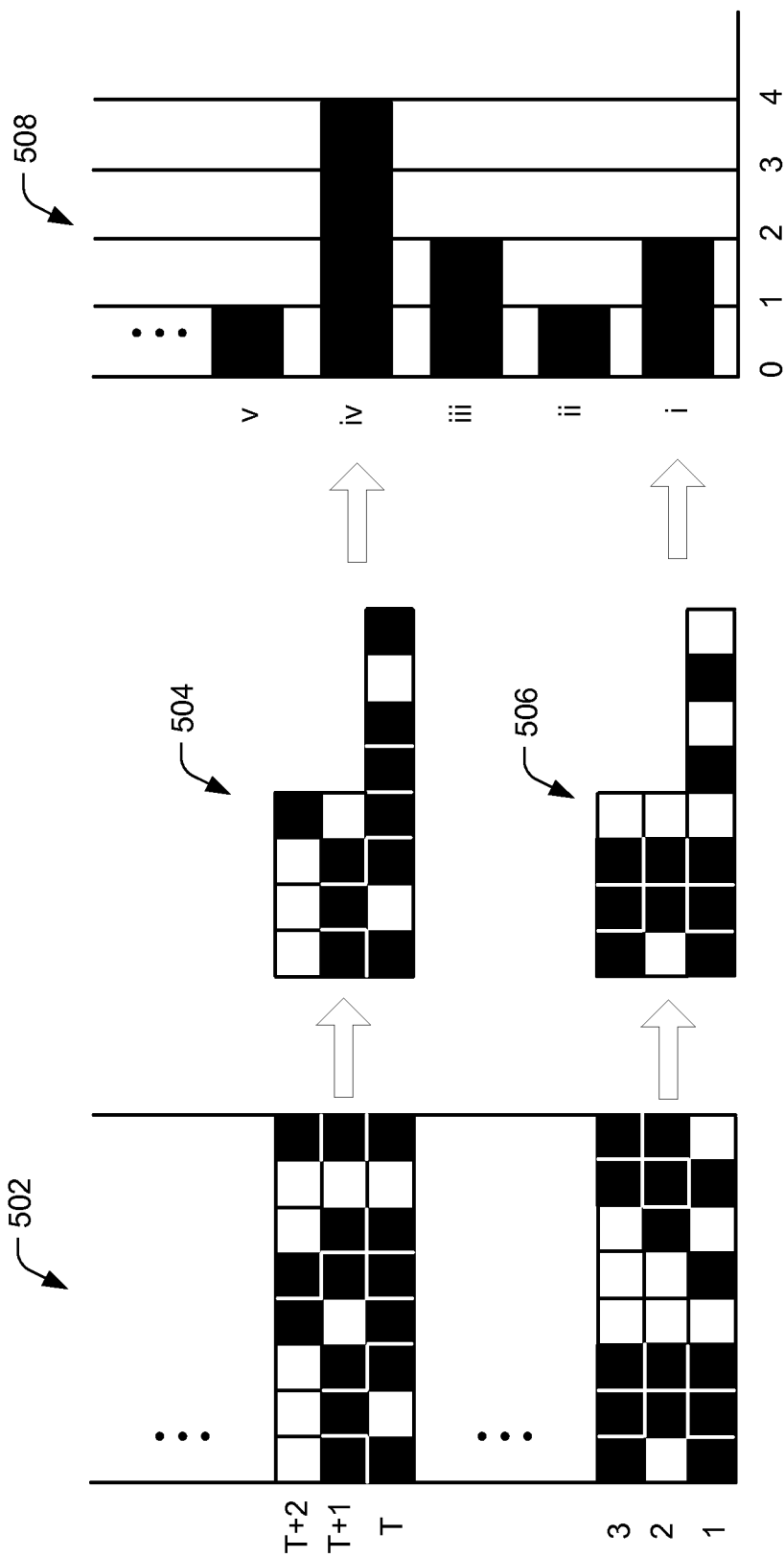
FIG. 5 illustrates an example application of the binary representations of FIGS. 3 and 4, in the form of visual shingles, according to an embodiment. The visual shingles are graphed in a histogram according to the number of appearances of the shingles in a given video.

FIG. 5 illustrates an example application of the binary representations 402 as shown in FIGS. 3 and 4, in the form of visual shingles, according to an embodiment. In one embodiment, the analysis component 114 arranges the binary representations 402 of the images into a temporally sequential arrangement 502. The temporally sequential arrangement 502 represents a video (e.g., video 106, video 108, etc.), since it includes a temporal sequence of binary representations 402 of images 104 from the video. Accordingly, as discussed above, the binary representations 402 are multi-dimensional feature vectors; and when taken together they represent sequential images of the video, arranged to form a "bag of image features," where the bag of features (e.g., the temporally sequential arrangement 502) represents the whole video.

The analysis component 114 may combine a number of temporally sequential binary representations 402 to form a visual shingle (e.g., 504, 506). The analysis component 114 may combine the binary representation 402 of one image from a video with one or more binary representations of other images from the video to form a visual shingle. For example, the visual shingle 504 is formed from the temporally sequential binary representations 402 labeled as T, T+1, and T+2. Additionally, the visual shingle 506 is formed from the temporally sequential binary representations 402 labeled as 1, 2, and 3. In various embodiments, the analysis component 114 may form any number of visual shingles by combining two or more temporally sequential binary representations 402 from the temporally sequential arrangement 502.

In one embodiment, as shown in FIG. 5, the visual shingles (e.g., 504, 506) need not include the binary information from an entire binary representation 402 that is combined to form the visual shingle. For example, visual shingle 504 is comprised of the entire binary representation 402 labeled T, but contains a portion of the binary representations 402 labeled T+1 and T+2. In the case of visual shingle 504, the portions of binary representations 402 labeled T+1 and T+2 represent the central binary vector feature (corresponding to central sub-image features) of the image 104 represented by binary representations T+1 and T+2. In alternate embodiments, portions of the marginal binary vector feature or a combination of the central binary vector feature and the marginal binary vector feature may be used to form a visual shingle (e.g., 504, 506). Since the visual shingles contain spatial information (based on the central and marginal vector information, including common feature relationships between sub-images) and temporal information (based on the temporal arrangement of the binary representations of the images, the visual shingles can be referred to as binary spatiotemporal features representing portions of a video.

In an embodiment, as shown in FIG. 5, the analysis component 114 may arrange visual shingles in a histogram 508. In an embodiment, the visual shingles (e.g., 504, 506) may be arranged in a histogram 508 according to the number of appearances of the visual shingles in a given video. For instance, histogram 508 shows that a visual shingle labeled "i" appears two times in a video (such as video 106), while a visual shingle labeled "ii" appears once and a visual shingle labeled "iv" appears four times in the same video. In an embodiment, the analysis component 114 produces histogram information (or a histogram 508) for a target video 106 and for any number of potentially similar videos 108.

The analysis component 114 may evaluate a similarity of a first video (such as the target video 106) to a second video (such as a potentially similar video 108) based on a number of occurrences of a visual shingle (e.g., 504, 508, etc.) in the first video and in the second video. For example, the analysis component 114 may determine that a target video 106 is similar to a potentially similar video 108 when the potentially similar video 108 comprises a same number of occurrences of one or more visual shingles as the target video 106. In some embodiments, the analysis component 114 may determine relative similarities of multiple potentially similar videos 108 to a target video 106 based on whether the potentially similar videos 108 comprise a number of visual shingles found in the target video 106, and based on whether the occurrence of the visual shingles is the same or close to the same as that in the target video 106.

In one implementation, the analysis component 114 evaluates a similarity of a first video to a second video using a histogram intersection method. For example, the analysis component 114 performs the evaluations described above using histograms 508 (or histogram information) for the target video 106 and each of the potentially similar videos 108 to be evaluated. Similar to that described above, a histogram intersection compares the histograms 508 (or histogram information) of the videos to be compared for similarity and outputs information regarding whether the potentially similar videos 108 comprise one or more visual shingles found in the target video 106, and whether the number of occurrences of the visual shingles in the potentially similar videos 108 is the same or close to the same as that in the target video 106. In some implementations, a determination of what comprises close to the same number of occurrences may be user-definable, and may include one or two occurrences away from the target video, or the like.

If included, the output component 116 (as shown in FIG. 1) may provide an output from the system 102. For example, an output may be provided from the system 102 to another system or process, and the like. In one embodiment, the output component 116 outputs results of a similarity evaluation by the analysis component 114. In an embodiment, the output may include a similarity 110 of a first video (e.g., target video 106) and a second video (e.g., potentially similar video 108). In one example, the output includes a relative similarity 110 of a target video 106 to multiple potentially similar videos 108. In an alternate embodiment, the output may also include additional information including rankings and the like.

In various embodiments, the similarity 110 of the target video 106 to one or more other videos 108 may be presented in the form of a prioritized list, a general or detailed analysis, and the like. In one embodiment, the similarity 110 may be presented in the form of a database or other similar output. In alternate embodiments, other configurations may be used to display the output, any associated information, or other details as desired (e.g., links to web pages, multimedia presentations, user comments, etc.).

In one embodiment, the output of the system 102 is displayed on a display device (not shown). In alternate embodiments, the display device may be any device for displaying information to a user (e.g., computer monitor, mobile communications device, personal digital assistant (PDA), electronic pad or tablet computing device, projection device, imaging device, and the like). For example, the similarity 110 may be displayed on a user's mobile telephone display. In alternate embodiments, the output may be provided to the user by another method (e.g., email, posting to a website, posting on a social network page, text message, etc.).

Indexing and Retrieval

In some embodiments, various techniques may be employed to improve the efficiency of calculations in determining the similarity of a first video to one or more other videos. In one embodiment, the analysis component 114 is configured to combine a first group of binary representations 402 of images 404 from the first video (video 106, for example) to form a first group of visual shingles and combine a second group of binary representations 402 of images 410 from the second video (video 108, for example) to form a second group of visual shingles. The analysis component 114 may then store the first group of visual shingles and the second group of visual shingles in a data structure, in a pre-determined order based on the number of occurrences of a common visual shingle in the first video and the second video. For example, the first video and the second video may each contain at least one common visual shingle, where the visual shingle represents two or more images from the videos. The analysis component 114 may then store the first and second groups of visual shingles in a data base, for example, in ascending order (or alternately in descending order) based on the number of occurrences of the common visual shingle in the videos. If, for example, the first video contains three occurrences of the visual shingle and the second video contains five occurrences of the video shingle, then the first group of visual shingles may be stored in a first location in the database corresponding to a lesser number of occurrences, and the second group of visual shingles may be stored in a second location in the database corresponding to a greater number of occurrences.

In some embodiments, the storage techniques described above improve the efficiency of evaluation and determination of similarities between videos. Similarity evaluation methods may be applied, including histogram intersection techniques. After representing the videos (e.g., 106, 108) with histogram information, the analysis component 114 may index the temporally sequential arrangement 502 (i.e., the bag of image features) by an inverted file technique. Efficiency in indexing and retrieval may also be improved by employing example fast intersection kernel techniques with the analysis component 114, as described herein.

For example, let S denote the Web video dataset of size |S|. Let $M_i$ denote the number of extracted or received images for the i-th dataset video, and the maximal value is denoted by $M^{max}$. The number of extracted images for a target video is $M_q$. Let V denote the visual shingle vocabulary, whose size is denoted by |V|. Target video $V_q$ (such as target video 106) is represented by $[t_q^1, \ldots, t_q^w, \ldots, t_q^{|V|}]$ and $t_q^w$ represents the number of times the w-th visual shingle occurs in the target video. Similarly, the i-th dataset video $V_i$ is represented by $[t_i^1, \ldots, t_i^w, \ldots, t_i^{|V|}]$, here $1 \leq i \leq |S|$.

In one embodiment, the histogram intersection may be described as:

$$sim(V_q, V_i) = \frac{\sum_w \min(t_q^w, t_i^w)}{\sum_w \max(t_q^w, t_i^w)}.$$

The histogram intersection is used to measure the similarity between a target video 106 and one or more other videos 108. To speed up near-duplicate video retrieval, an efficient histogram intersection calculation method based on fast intersection kernel and inverted file is employed.

For example, the histogram intersection equation above can be rewritten as:

$$sim(V_q, V_i) = \frac{\sum_w \min(t_q^w, t_i^w)}{\sum_w t_q^w + \sum_w t_i^w - \sum_w \min(t_q^w, t_i^w)}$$

$$= \frac{\sum_w \min(t_q^w, t_i^w)}{M_q + M_i - \sum_w \min(t_q^w, t_i^w)},$$

where the first and second terms of the denominator are fixed values. Therefore, an efficient calculation of the rewritten equation is dependent on techniques to reduce the number of comparison and summation operations involved in the numerator of the rewritten equation. The numerator of the equation is the overlapping part of an intersection of two histograms. The terms of the denominator include the number of extracted or received images for the i-th potentially similar video. In the worst case, the number of comparison and summation operations are both ($|V|\cdot|S|$). The number of comparison and summation operations can both be reduced to ($M^{max}\cdot|S|$) using an inverted file indexing structure.

In an embodiment, the number of comparisons by the analysis component 114 can be further reduced using a fast intersection kernel technique. For example, the analysis component 114 can sort the appearing times $t_i^w$ of a visual shingle in a video in ascending (or descending) order and use a binary search to replace pairwise comparisons. In this way, the number of comparisons may be reduced from ($M^{max}\cdot|S|$) to ($M^{max}\cdot\log|S|$). Moreover, using the w-th visual shingle as an example, the set $\{t_i^w|1\leq i\leq|S|\}$ contains at most $M^{max}$ unique values, since $t_i^w\leq M_i\leq M^{max}$. Thus, the time of binary search on a sorted list can further be reduced to ($\log M^{max}$) with the use of the following modified inverted file technique.

Figure 6:
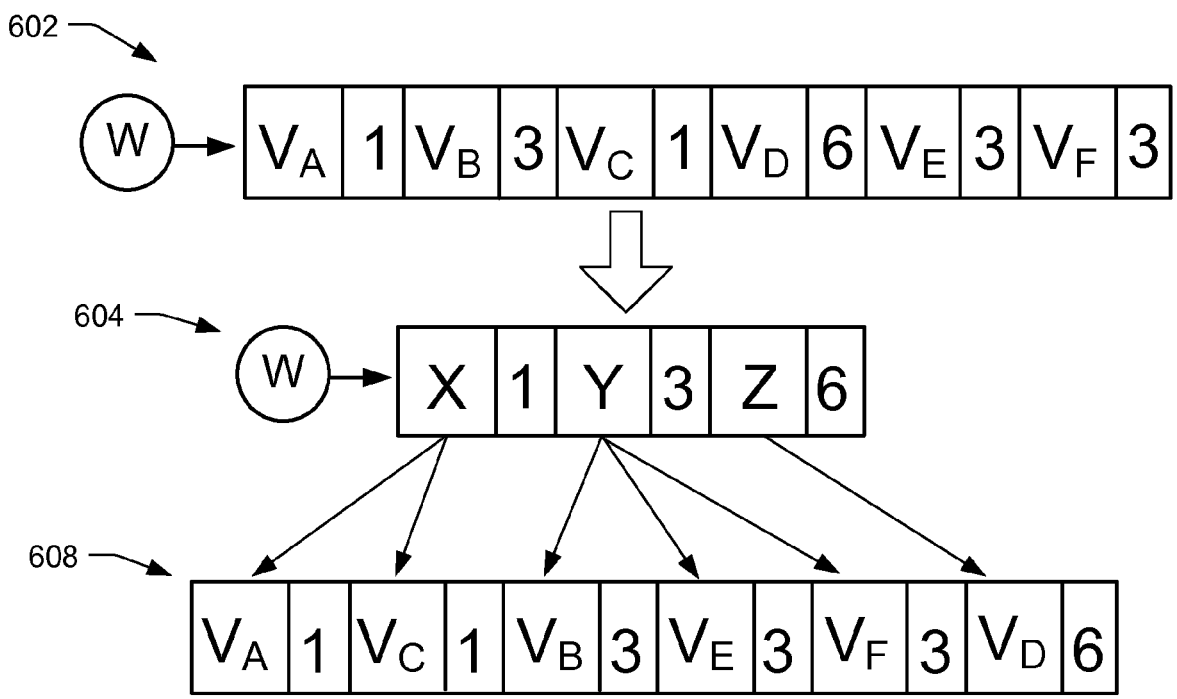
FIG. 6 illustrates an example technique for grouping videos based on the number of appearances of identified shingles in a given video, according to an embodiment.

FIG. 6 illustrates an example modified inverted file technique for grouping videos based on the number of appearances of identified visual shingles in a given video. The technique may be performed by the analysis component 114, for example. As shown in FIG. 6 at 602, each visual shingle "W" is followed by all of the videos (e.g., $V_A$, $V_B$, $V_C$, $V_D$, $V_E$, and $V_F$) in which the visual shingle W occurs. Following each listed video is a number representing the number of occurrences of the visual shingle W in that video. For example, there is a "1" following video $V_A$, indicating that the visual shingle W occurs one time in the video $V_A$. Additionally, there is a "3" following video $V_B$, indicating that the visual shingle W occurs three times in the video $V_B$, and so on.

As shown in FIG. 6 at 604, the occurrences (i.e., appearing times) of the visual shingle W in the example set of videos includes 1, 3, and 6 times in various videos. In an embodiment, the analysis component 114 may group videos according to the occurrence times. Thus, three groups are shown in the example of FIG. 6 at 604: group X, comprising videos with one occurrence of the visual shingle W; group Y, comprising videos with three occurrences of the visual shingle W; and group Z, comprising videos with six occurrences of the visual shingle W. As shown in FIG. 6 at 608, the analysis component 114 can rearrange the list of videos so that they are in ascending (or alternately descending) order, based on the number of occurrences of the visual shingle W in the videos. For example, videos $V_A$ and $V_C$ are grouped together as having one occurrence, then videos $V_B$, $V_E$ and $V_F$ are grouped together as having three occurrences, and finally $V_D$ is listed as having six occurrences of the visual shingle W. In various embodiments, more groups or fewer groups may be present, based on a number of occurrences of a visual shingle W in the videos.

In one embodiment, the locations of each of the videos (e.g., potentially similar videos 108) in each group are stored in a list. In the embodiment, the analysis component 114 may conduct a binary search on the list for each visual shingle of the target video 106. With this technique, no pairwise comparison of the videos 108 themselves to the target video 106 or to each other is needed. In an implementation, one or more pointer variables may be used to point to a location within the list. For example, a pointer variable may be used to point to a representation of a video (for example, the first video) in each group (i.e., groups X, Y, Z, etc.). In other implementations, pointer variables may be used to point to other locations within the list as desired.

In one embodiment, given a visual shingle $S^W$, $1\leq n_1^w<n_2^w<\ldots<n_{L_w}^w\leq M^{max}$ denotes all of the non-zero visual shingle occurrence times. Let $V_{k,1}^w,\ldots V_{k,l}^w,\ldots,V_{k,l_k}^w$ denote the videos containing $n_k^w$ number of visual shingles $S^w$. Pointer type variable $p_k^w$ holds the address of the video $V_{k,l_k}^w$. The "w-th video ID array" (denoted as $VID^w$) records all the video IDs which have a non-zero number of visual shingles $S^W$. For example, the first tuple may be denoted as $(n_1^w,p_1^w)$. If videos $V_{1,1}^w$ and $V_{1,2}^w$ contain the same number of the visual shingle $S^w$, they are stored together, and $p_1^w$ holds the address of video $V_{1,2}^w$. For a target video $V_q$ containing $n_q^w$ visual shingles $S_w$, to calculate the similarity between the target video 106 and a potentially similar video 108, a binary search may be first conducted on sorted values $\{n_k^w|1\leq k\leq L_w\}$ to find the value r satisfying $n_r^w<n_q^w\leq n_{r+1}^w$. Then the analysis component 114 may scan $VID^w$ from the first entry and update similarities. The intersection kernel of $V_q$ and $V_{k,l}^w$ is added by $n_k^w$ for the videos from the first entry to the one pointed by $p_r^w$, and added by $n_q^w$ for all the other videos of $VID^w$.

Example Processes

FIGS. 7 and 8 illustrate example methodologies for automatically determining a similarity of one or more videos to a target video, according to an example embodiment. While the exemplary methods are illustrated and described herein as a series of blocks representative of various events and/or acts, the subject matter disclosed is not limited by the illustrated ordering of such blocks. For instance, some acts or events may occur in different orders and/or concurrently with other acts or events, apart from the ordering illustrated herein. In addition, not all illustrated blocks, events or acts, may be required to implement a methodology in accordance with an embodiment. Moreover, it will be appreciated that the exemplary methods and other methods according to the disclosure may be implemented in association with the methods illustrated and described herein, as well as in association with other systems and apparatus not illustrated or described. For example, example methodologies may be implemented as instructions (e.g., computer executable instructions) that when executed by a computing device (e.g., processor(s) 118), FIG. 7 illustrates an example methodology 700 of determining the similarity of a video (such as a potentially similar video 108, for example) to a target video (such as target video 106, for example), according to an example embodiment. The process described is also applicable to determining a similarity of each of a group of videos to a target video or to each other.

At block 702, a system or device (such as the system 102, for example) receives a video having an image (such as image 104, 404, or 410 for example). In some embodiments, the system may extract the image from the video. Additionally, the system may receive or extract multiple images from the video. In alternate embodiments, the system may receive or extract images based on shots or sequences of the video, based on a regular time interval (such as receiving or extracting one image per second, and the like), or based on other criteria (such as identified key frames, or the like).

At block 704, the method includes dividing the image into a plurality of sub-images (such as sub-images 202, for example). In one embodiment, the image may be divided into a two-dimensional matrix of sub-images.

At block 706, the method includes determining a feature common to each of the sub-images. In one embodiment, the feature common to each of the sub-images comprises a feature representing at least one of spatial, color, or temporal information. For example, the feature may be an average gray-level for each sub-image, or the like.

At block 708, the method includes creating a binary vector representation of the image based on the feature common to the sub-images. Various techniques may be employed to create the binary vector representation of the image. In one example, a technique includes assigning a rank to each of the sub-images based on the common feature. This may include assigning a score to the sub-images based on the average gray-level intensity, for example.

The example technique may further include creating a central binary vector feature based on ordinal relationships of centrally arranged sub-images. This may include comparing the rank of a central sub-image to the rank of each of the centrally arranged sub-images located on a perimeter of the image. A binary high value can be assigned to a centrally arranged sub-image located on the perimeter when the central sub-image is higher in rank than the centrally arranged sub-image located on the perimeter. Additionally, a binary low value can be assigned to a centrally arranged sub-image located on the perimeter when the central sub-image is lower in rank than the centrally arranged sub-image located on the perimeter. In alternate embodiments, assignments of binary values may be performed according to other rules, based on other relationships between the sub-images, or the like.

The example technique may then include capturing the assigned binary high and low values in a vector form to create the central binary vector feature.

The example technique may further include creating a marginal binary vector feature based on ordinal relationships of marginally arranged sub-images. This may include comparing the rank of each marginally arranged sub-image to the rank of an adjacent marginally arranged sub-image. A binary high value may be assigned to a marginally arranged sub-image when the marginally arranged sub-image is higher in rank than the adjacent marginally arranged sub-image. Additionally, a binary low value may be assigned to a marginally arranged sub-image when the marginally arranged sub-image is lower in rank than the adjacent marginally arranged sub-image. In alternate embodiments, assignments of binary values may be performed according to other rules, based on other relationships between the sub-images, or the like.

The example technique may then include capturing the assigned binary high and low values in a vector form to create the marginal binary vector feature.

In some embodiments, the example technique may include concatenating the central binary vector feature and the marginal binary vector feature to create the binary vector representation of the image.

At block 710, the method includes combining the binary vector representation of the image with a second binary vector representation of a second image from the video to form a visual shingle. In one embodiment, the visual shingle comprises the binary vector representation of the image combined with a partial binary vector representation of the second image. For example, the partial binary vector representation may include a central binary vector representation of the second image. Alternately, the partial binary vector representation may include a marginal binary vector representation of the second image. In an embodiment, the second image is temporally adjacent to the image. In other embodiments, several binary vector representations of images, including partial binary vector representations, are combined to form a visual shingle. For example, in one embodiment, the visual shingle may include a partial binary vector representation of a third image, where the partial binary vector representation includes a central binary vector representation of the third image and the third image is temporally adjacent to the second image.

At block 712, the method includes grouping the potentially similar video with another potentially similar video having the visual shingle. In some embodiments, grouping videos having a common visual shingle is an indexing technique that improves efficiency of searching, retrieving, and/or making comparisons with the videos.

At block 714, the method includes calculating a similarity of the potentially similar video to a target video and/or calculating a similarity of the other potentially similar video to the target video based on a number of times the visual shingle appears in the potentially similar video, the other potentially similar video, and the target video. In an embodiment, the videos may be ranked based on the similarity of the videos to the target video. In various embodiments, the similarity, rankings, and/or other related information may be output (for example, to a user).

FIG. 8 illustrates an example methodology 800 of determining the similarity of one or more videos to a target video, according to another example embodiment. The example methodology 800 shares some characteristics of the example methodology 700. In some implementations, both example methodologies (700, 800) may be employed together to determine the similarity of one or more videos to a target video. In alternate embodiments, however, portions of each of the example methodologies (700, 800) may be employed to determine the similarity of one or more videos to a target video without employing all of one or either of the example methodologies (700, 800).

At block 802, a system or device (such as the system 102, for example) receives a target video having one or more images (such as image 104, 404, or 410 for example) and a plurality of other videos having one or more images. As previously discussed, the images may be extracted from received videos.

At block 804, the method includes creating visual shingles from the images, each visual shingle comprising a binary representation of an image. In various embodiments, creating visual shingles from the images may be accomplished using various techniques, including those described previously.

At block 806, the method includes combining two or more visual shingles to produce a first binary vector representation of the target video and a plurality of other binary vector representations of the plurality of videos. In one embodiment, combining the visual shingles includes arranging the visual shingles in a temporal sequential order to produce the first binary vector representation and to produce the plurality of other binary vector representations. In some embodiments, each binary vector representation is also referred to as a "bag of image features" representing a respective video.

At block 808, the method includes grouping the plurality of videos according to a number of appearances of a visual shingle in videos of the plurality of videos. In one embodiment, the grouping includes grouping together videos of the plurality of videos when a predetermined visual shingle appears a same number of times in the videos. For example, all videos having an identified visual shingle that occurs three times in the video may be grouped together, and so on.

At block 810, the method includes indexing the plurality of other binary vector representations in a data structure based on the grouping of the plurality of videos. For example, the plurality of other binary vector representations may be arranged in the data structure in a descending order according to a number of appearances of the visual shingle in the respective videos of the plurality of videos.

At block 812, the method includes calculating a histogram intersection of the first binary vector representation with the plurality of other binary vector representations. In one embodiment, the histogram intersection calculations are performed on combinations of videos according to a sequence based on the indexing. For example, the histogram intersection calculations may proceed in an arrangement based on groups of videos that share a common visual shingle, and particularly based on groups of videos where the visual shingle appears in the videos the same number of times. In various embodiments, the histogram intersection calculations may proceed in an ascending or descending order through the groups of videos, where the number of occurrences of the visual shingle in the videos is ascending or descending respectively.

At block 814, the method includes outputting the similarities (such as similarities 110) of the plurality of videos to the target video based on the calculation. In some embodiments, the similarities are output to a user, a process, a system, or the like.

CONCLUSION

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

The invention claimed is:

1. A system for determining a similarity of a first video to a second video, the system comprising:
   one or more processors;
   memory coupled to the one or more processors;
   an analysis component stored in the memory and operable on the one or more processors to:
      receive an image from the first video;
      divide the image into a plurality of sub-images, the plurality of sub-images including marginally arranged sub-images;
      determine a feature common to each of the plurality of sub-images;
      score the sub-images based on the common feature;
      create a binary representation of the image based on the scoring of the sub-images, one or more individual binary values of the binary representation representing rank relationships between individual ones of the marginally arranged sub-images compared to other individual ones of the marginally arranged sub-images;
      combine the binary representation of the image with another binary representation of another image from the first video to form a visual shingle; and
      evaluate a similarity of the first video to the second video based on a number of occurrences of the visual shingle in the first video and a number of occurrences of the visual shingle in the second video; and
   an output component stored in the memory and operable on the one or more processors to output results of the evaluation.

2. The system of claim 1, wherein the image is divided into a two-dimensional matrix of sub-images.

3. The system of claim 1, wherein the feature common to each of the plurality of sub-images comprises a global feature representing gray-level intensity information.

4. The system of claim 1, wherein individual ones of the one or more binary values are determined based at least in part on comparing an intensity value of a first sub-image with that of a second sub-image, by assigning a 1 value when the intensity value of the first sub-image is greater than the intensity value of the second sub-image, and assigning a 0 value when the intensity value of the first sub-image is less than the intensity value of the second sub-image.

5. The system of claim 1, wherein the plurality of sub-images further include a central sub-image and centrally arranged sub-images, and wherein the binary representation of the image comprises a spatiotemporal binary vector, wherein one or more other individual binary values of the binary representation represent rank relationships between the central sub-image compared to individual ones of the centrally arranged sub-images.

6. The system of claim 1, wherein the plurality of sub-images further include a central sub-image, and wherein the analysis component is configured to combine a third binary representation of a third image from the first video to the binary representation and the other binary representation, wherein the binary representation, the other binary representation, and the third binary representation are combined in a temporal sequence to form the visual shingle, the third binary representation corresponding to features of the central sub-image.

7. The system of claim 1, wherein the analysis component is further configured to store the first visual shingle and the number of occurrences of the visual shingle in the first video in a data structure, in a predetermined order based on the number of occurrences of the visual shingle in the first video.

8. The system of claim 1, wherein the analysis component is further configured to form a histogram based on the first video, the histogram representing the number of occurrences of one or more visual shingles occurring in the first video, including the visual shingle, and
   wherein the analysis component is further configured to form a second histogram based on the second video, the second histogram representing a number of occurrences of one or more visual shingles occurring in the second video, including the visual shingle.

9. The system of claim 8, wherein the analysis component is further configured to evaluate a similarity of the first video to the second video using a histogram intersection method.

10. One or more computer storage media comprising computer-executable instructions that, when executed by a computer processor, direct the computer processor to perform operations including:
   receiving an image from a video;
   dividing the image into a plurality of sub-images, the plurality of sub-images including marginally arranged sub-images;
   determining a feature common to the plurality of sub-images;
   creating a binary vector representation of the image based on the feature common to the plurality of sub-images, one or more individual binary values of the binary representation representing rank relationships between individual ones of the marginally arranged sub-images compared to other individual ones of the marginally arranged sub-images;
   combining the binary vector representation of the image with a second binary vector representation of a second image from the video to form a visual shingle; and calculating a similarity of the video to another video based on a number of times the visual shingle appears in the video and a number of times the visual shingle appears in the other video.

11. The one or more computer storage media of claim 10, wherein the feature common to the plurality of sub-images comprises a feature representing at least one of spatial, color, or temporal information.

12. The one or more computer storage media of claim 10, wherein the plurality of sub-images further includes a central sub-image and centrally arranged sub-images, and wherein one or more other individual binary values of the binary representation represent rank relationships between the central sub-image compared to individual ones of the centrally arranged sub-images.

13. The one or more computer storage media of claim 10, wherein the individual ones of the marginally arranged sub-images are adjacent to the other individual ones of the marginally arranged sub-images.

14. The one or more computer storage media of claim 10, wherein the second binary vector representation of the second image comprises a partial binary vector representation of the second image, the partial binary vector representation including a central binary vector representation of the second image, the second image being temporally adjacent to the image.

15. The one or more computer storage media of claim 14, wherein the visual shingle includes a partial binary vector representation of a third image, the partial binary vector representation of the third image including a central binary vector representation of the third image, the third image being temporally adjacent to the second image.

16. The one or more computer storage media of claim 10, wherein the computer-executable instructions, when executed by a computer processor, direct the computer process to perform further operations including:
  accessing a data structure indexed by the visual shingle listing one or more videos in which the visual shingle occurs, including at least another video, and listing a number of times the visual shingle appears in each of the one or more videos; and
  retrieving, from the data structure, a number of occurrences of the visual shingle in the other video of the one or more videos.

17. The one or more computer-readable storage media of claim 16, further comprising updating the data structure indexed by the visual shingle to list the video and to list the number of occurrences of the visual shingle in the video.

18. A computer implemented method of determining similarities of a plurality of videos to a target video, the method comprising:
  receiving images from the target video and images from the plurality of videos;
  creating visual shingles from the images, each visual shingle comprising a binary representation of an image, one or more individual binary values of the binary representation representing rank relationships between individual ones of marginally arranged sub-images of the image compared to other individual ones of the marginally arranged sub-images of the image;
  combining visual shingles to produce a first binary vector representation of the target video and a plurality of other binary vector representations of the plurality of videos;
  grouping the plurality of videos according to a number of appearances of a particular visual shingle in videos of the plurality of videos;
  indexing the plurality of other binary vector representations in a data structure based on the grouping of the plurality of videos;
  calculating a histogram intersection of the first binary vector representation with the plurality of other binary vector representations, in a sequence based on the indexing; and
  outputting the similarities of the plurality of videos to the target video based on the calculation.

19. The computer implemented method of claim 18, wherein the combining comprises arranging visual shingles in a temporal sequential order to produce the first binary vector representation and to produce the plurality of other binary vector representations.

20. The computer implemented method of claim 18, further comprising grouping together videos of the plurality of videos when a predetermined visual shingle appears a same number of times in the videos.

* * * * *